Feb. 27, 1934.   H. MOLLY   1,948,991

BRAKE LEVER CONSTRUCTION

Filed Feb. 16, 1933

Inventor: Hans Molly

Patented Feb. 27, 1934

1,948,991

UNITED STATES PATENT OFFICE 1,948,991

BRAKE LEVER CONSTRUCTION

Hans Molly, Friedrichshafen, Germany, assignor to Zahnradfabrik Friedrichshafen Aktiengesellschaft, Friedrichshafen, Germany Application February 16, 1933, Serial No. 657,016
In Germany March 4, 1932

6 Claims. (Cl. 74—39)

My invention relates to brake lever constructions, especially for emergency brakes in motor vehicles.

The main object of the invention is simplification in design and operation of the brake lever. When using my brake lever it is possible to exert any desired braking power and to have the lever arrested in its corresponding position, and besides no special device is necessary for releasing the lever. The operator when braking has to do nothing but to draw the lever in the braking direction to the braking degree desired. If he takes the hand off the lever, the lever rests in the prevailing position and the brakes are held tight to the desired degree. If the operator wants to exert more braking power, he has to move the lever further. But if he desires to release the brake, he has to do nothing but to move the lever in the opposite direction.

The design of my new brake lever is very simple. I provide a member having an aperture for sliding on a bar. By means of a connecting rod or the like the brakes act on this member and tend to turn it. Thereby the edges of the aperture are pressed against the rod and this pressure prevents the member from being drawn backwards.

There is a guiding element in connection with the operating lever and adapted to shift the above mentioned member along the bar penetrating therethrough. By means of this element the member may be shifted to and fro. But as soon as the operating lever or the guiding member is released the tension from the brake or from the usual spring tending to prevent the brake elements from coming into engagement, cause the sliding member to be jammed on the bar.

Having given a short general description of my invention I now want to point it out more in detail referring to the drawing which represent two examples embodying my invention.

Figure 1:
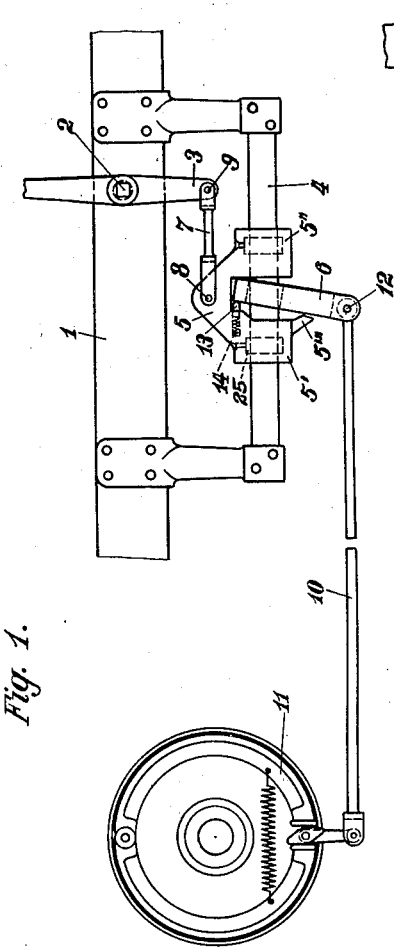
Fig. 1 is a side elevation illustrating one form of construction of the lever mechanism.

In both figures the numeral 1 indicates a portion of the chassis of a motor vehicle. Pivoted thereto at 2 is brake lever 3. There is a bar 4 rigidly fixed to the chassis. A forked member 5 is adapted to slide on bar 4, and between its two branches 5' and 5" an element 6 is situated having an aperture through which bar 4 extends. A connecting link 7 with one end is journaled at 8 in element 5 and with its other end at 9 in lever 3. Rod 10 transmitting the braking force to brake 11 is journaled in element 6 at 12. The left hand branch 5' of member 5 has a projection 5''' adapted to bear against the lower portion of element 6 not far from journaling point 12.

If the lower portion of lever 3 is moved to the right, projection 5''' causes element 6 to be moved to the right also, and thereby braking effect is exerted. When the hand of the operator is taken off the lever the brake tension transmitted on element 6 by means of rod 10 causes this element to take the inclined position as shown in Fig. 1. In this position the right upper edge and the left lower edge of the aperture in the element 6 bear against bar 4, and thus element 6 is jammed on this bar in the very position in which the operator took his hand off the lever 3 or ceased to exert braking power thereon.

To release the brake again the operator moves the lever 3 with its lower portion to the left thereby causing member 5 to shift element 6 to the left also. To prevent element 6 from getting into an oppositely inclined position a spring actuated bolt 13 or the like is provided in the left hand branch 5' of member 5. This bolt 13 also serves for preventing undesired release of element 6 because of rattling and the like. Spring 14 acting on bolt 13 should be comparatively weak as it has to have no other influence but to cause that element 6 is inclined always in the same direction.

Figure 2:
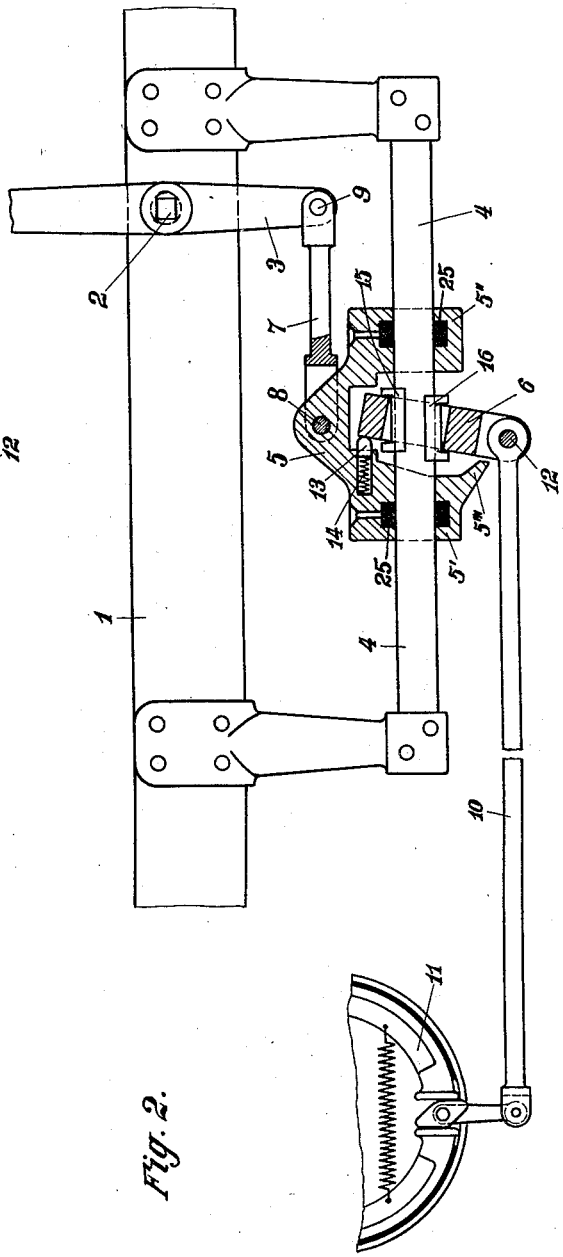
Fig. 2 is also a side elevation, but showing certain parts in section, of a modified form of construction.

The modification shown in Fig. 2 differs from that of Fig. 1, except in scale, only in the two shoe-like elements 15 and 16 which are inserted in the aperture of element 6 for the purpose of distributing the edge pressure of element 6 over a longer portion of bar 4, which is advantageous for the jamming effect and at the same time diminishes the wear of the members concerned. Collars 25 of felt or the like serve for closely guiding member 5 on bar 4.

I do not want to be limited to the details described or shown in the drawing, as many variations will occur to those skilled in the art.

What I claim is:

1. A brake lever construction comprising; a bar; a member having an aperture fitting around said bar; a connecting rod leading to the brake and being pivoted to said member at a distance from said aperture; a guiding element adapted to slide along said bar, said element having two portions, one of said portions being adapted to move said member in the direction for actuating the brake; the other portion being adapted to move said member in the brake-releasing direction; an operating lever; and a connecting link between said operating lever and said element.

2. A brake lever construction comprising; a bar; a member having an aperture fitting around said bar; a connecting rod leading to the brake and being pivoted to said member at a distance from said bar; a guiding element adapted to slide along said bar, said element having two portions, the first one of said portions having a projection adapted to move said member in the direction for actuating the brake, said projection being situated nearly opposite to said pivot for said connecting rod in said member, the second one of said portions being adapted to move said member in the brake-releasing direction; an operating lever; and a connecting link between said operating lever and said element.

3. A brake lever construction as claimed in claim 2 further including resilient means associated with said guiding element, said means being adapted to cause said member fitting around said bar to be always inclined in the same direction with respect to said bar.

4. A brake lever construction as claimed in claim 1, further including two shoe-like elements adapted to slide on said bar and being inserted in the aperture of said member.

5. A brake lever construction as claimed in claim 2, further including two shoe-like elements adapted to slide on said bar and being inserted in the aperture of said member.

6. A brake lever construction as claimed in claim 1, further including two shoe-like elements adapted to slide on said bar and being inserted in the aperture of said member; and resilient means associated with said guiding element, said means being adapted to cause said member fitting around said bar to be inclined always in the same direction with respect to said bar.

HANS MOLLY.